(12) United States Patent
Li et al.

(10) Patent No.: US 11,482,208 B2
(45) Date of Patent: Oct. 25, 2022

(54) METHOD, DEVICE AND STORAGE MEDIUM FOR SPEECH RECOGNITION

(71) Applicant: BEIJING DAJIA INTERNET INFORMATION TECHNOLOGY CO., LTD., Beijing (CN)

(72) Inventors: Jie Li, Beijing (CN); Xiaorui Wang, Beijing (CN); Yan Li, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 231 days.

(21) Appl. No.: 16/891,593

(22) Filed: Jun. 3, 2020

(65) Prior Publication Data

US 2020/0294488 A1 Sep. 17, 2020

(30) Foreign Application Priority Data

Jun. 3, 2019 (CN) .......................... 201910477492.6

(51) Int. Cl.
*G10L 15/02* (2006.01)
*G06F 40/166* (2020.01)
*G06F 40/242* (2020.01)
*G10L 15/187* (2013.01)

(52) U.S. Cl.
CPC ............ *G10L 15/02* (2013.01); *G06F 40/166* (2020.01); *G06F 40/242* (2020.01); *G10L 15/187* (2013.01); *G10L 2015/027* (2013.01)

(58) Field of Classification Search
CPC ...... G06F 40/166; G06F 40/242; G06F 40/20; G10L 2015/027; G10L 2015/0633
See application file for complete search history.

(56) References Cited

U.S. PATENT DOCUMENTS

| 9,263,036 | B1* | 2/2016 | Graves | G06N 3/0445 |
| 10,854,193 | B2* | 12/2020 | Fu | G10L 15/28 |
| 2006/0287847 | A1* | 12/2006 | Moore | G06F 40/45 |
| | | | | 704/8 |
| 2009/0326945 | A1* | 12/2009 | Tian | G10L 15/005 |
| | | | | 704/E15.005 |

(Continued)

FOREIGN PATENT DOCUMENTS

| CN | 102623010 A | 8/2012 |
| CN | 106548775 A | 3/2017 |

(Continued)

*Primary Examiner* — Jesse S Pullias
(74) *Attorney, Agent, or Firm* — Meunier Carlin & Curfman LLC (57) ABSTRACT

Disclosed are a method, device and readable storage medium for speech recognition. The method includes: determining speech features of the speech data by feature extraction on the speech data; determining syllable data corresponding to each of the speech features based on a plurality of feature extraction layers and a softmax function layer included in an acoustic model, where the acoustic model is configured to convert the speech feature into the syllable data; determining text data corresponding to the speech data based on a language model, a pronouncing dictionary and the syllable data, where the pronouncing dictionary is configured to convert the syllable data into the text data, and the language model is configured to evaluate the text data; and outputting the text data.

18 Claims, 6 Drawing Sheets

(56) References Cited

U.S. PATENT DOCUMENTS

| | | | | |
|---|---|---|---|---|
| 2015/0134332 | A1* | 5/2015 | Liu | G10L 15/18 |
| | | | | 704/243 |
| 2018/0047385 | A1* | 2/2018 | Jiang | G10L 15/063 |
| 2020/0043483 | A1* | 2/2020 | Prabhavalkar | G10L 15/197 |
| 2020/0312309 | A1* | 10/2020 | Lin | G06N 3/0454 |

FOREIGN PATENT DOCUMENTS

| | | |
|---|---|---|
| CN | 107154260 A | 9/2017 |
| CN | 107195296 A | 9/2017 |
| CN | 107293288 A | 10/2017 |
| CN | 108182937 A | 6/2018 |
| CN | 108389573 A | 8/2018 |
| CN | 108389575 A | 8/2018 |
| CN | 108711420 A | 10/2018 |
| CN | 109065033 A | 12/2018 |
| CN | 109065044 A | 12/2018 |
| CN | 109119072 A | 1/2019 |
| CN | 109243428 A | 1/2019 |
| CN | 109360553 A | 2/2019 |
| CN | 109754790 A | 5/2019 |

\* cited by examiner

Fig. 9

METHOD, DEVICE AND STORAGE MEDIUM FOR SPEECH RECOGNITION

CROSS REFERENCE TO RELATED APPLICATION

This application is based on and claims priority under 35 U.S.C 119 to Chinese Patent Application No. 2019-10477492.6, filed on Jun. 3, 2019, in the China National Intellectual Property Administration. The entire disclosure of the above application is incorporated herein by reference.

FIELD

The present disclosure relates to the field of audio processing and in particular to a method, device and storage medium for speech recognition.

BACKGROUND

Automatic speech recognition is primarily used to convert spoken words into computer text by using algorithms. With the rise of the Internet, the rapid development of electronic business and the globalization, encounters between different languages are more and more frequent. As such, it is inevitable that people may change from one language to another during their daily communication. For example, in China, talking in Chinese mixed with foreign language is common, such as, "我今天晚上要赶我的 project, 你不要等我回宿舍了", "我不是很 sure, 也许有些 term 不好 translate, 或者要 show off 自己的外语 level".

For the speech data in mixed language with English words in Chinese expression, English words often few and thus the English speech is generally short. For example, for the speech "你这件大衣好 fashion 啊", the speech data in English is relatively short, which results in relatively low accuracy of language identification and further results in relatively low accuracy for speech recognition.

SUMMARY

The present disclosure provides a method, device and computer readable storage medium for speech recognition.

In some embodiments, a method for speech recognition is provided. The method includes: determining speech features of the speech data by feature extraction on the speech data; determining syllable data corresponding to each of the speech features based on a plurality of feature extraction layers and a softmax function layer included in an acoustic model, where the acoustic model is configured to convert the speech feature into the syllable data; determining text data corresponding to the speech data based on a language model, a pronouncing dictionary and the syllable data, where the pronouncing dictionary is configured to convert the syllable data into the text data, and the language model is configured to evaluate the text data; and outputting the text data.

In some embodiments, an electronic device for speech recognition is provided. The electronic device includes a processor and a memory, the memory stores at least one instruction, and the instruction being loaded and executed by the processor to perform: determining speech features of the speech data by feature extraction on the speech data; determining syllable data corresponding to each of the speech features based on a plurality of feature extraction layers and a softmax function layer included in an acoustic model, where the acoustic model is configured to convert the speech feature into the syllable data; determining text data corresponding to the speech data based on a language model, a pronouncing dictionary and the syllable data, where the pronouncing dictionary is configured to convert the syllable data into the text data, and the language model is configured to evaluate the text data; and outputting the text data.

In some embodiments, a non-transitory computer readable storage medium for speech recognition is provided. When an instruction in the storage medium is executed by a processor of an electronic device, the electronic device performs: determining speech features of the speech data by feature extraction on the speech data; determining syllable data corresponding to each of the speech features based on a plurality of feature extraction layers and a softmax function layer included in an acoustic model, where the acoustic model is configured to convert the speech feature into the syllable data; determining text data corresponding to the speech data based on a language model, a pronouncing dictionary and the syllable data, where the pronouncing dictionary is configured to convert the syllable data into the text data, and the language model is configured to evaluate the text data; and outputting the text data.

It should be understood that the above general description and the following detailed description are merely exemplary and explanatory, but are not intended to limit the present disclosure.

BRIEF DESCRIPTION OF THE DRAWINGS

Accompanying drawings described herein are incorporated into the specification to build a part of the specification, show embodiments conforming to the present disclosure and explain the principle of the present disclosure together with the specification.

DETAILED DESCRIPTION OF THE EMBODIMENTS

Exemplary embodiments will be described herein in detail, and examples of the exemplary embodiments are shown in the accompanying drawings. When the following description relates to the accompanying drawings, the same numerals in the different accompanying drawings indicate same or similar elements unless otherwise denoted. The implementation ways described in the following exemplary embodiments do not represent for all the implementation ways consistent with the present disclosure. On the contrary, they are merely examples of an apparatus and method which are described in detail in appended claims and consistent with some aspects of the present disclosure.

A method in the embodiment of the present disclosure may be used for an electronic device, which is provided with a speech recognition system. The electronic device may be a terminal or a server. When the electronic device is the terminal, the terminal may directly acquire speech data. In some embodiments, the speech data may be that transcribed using the terminal, acquired by the server through the terminal or directly input to the terminal by a user. Then, the terminal performs speech recognition on the acquired speech data. When the electronic device is the server, the speech data may be acquired by the terminal through the server or directly input to the server by the user, and then, the server performs speech recognition on the acquired speech data.

Figure 1:
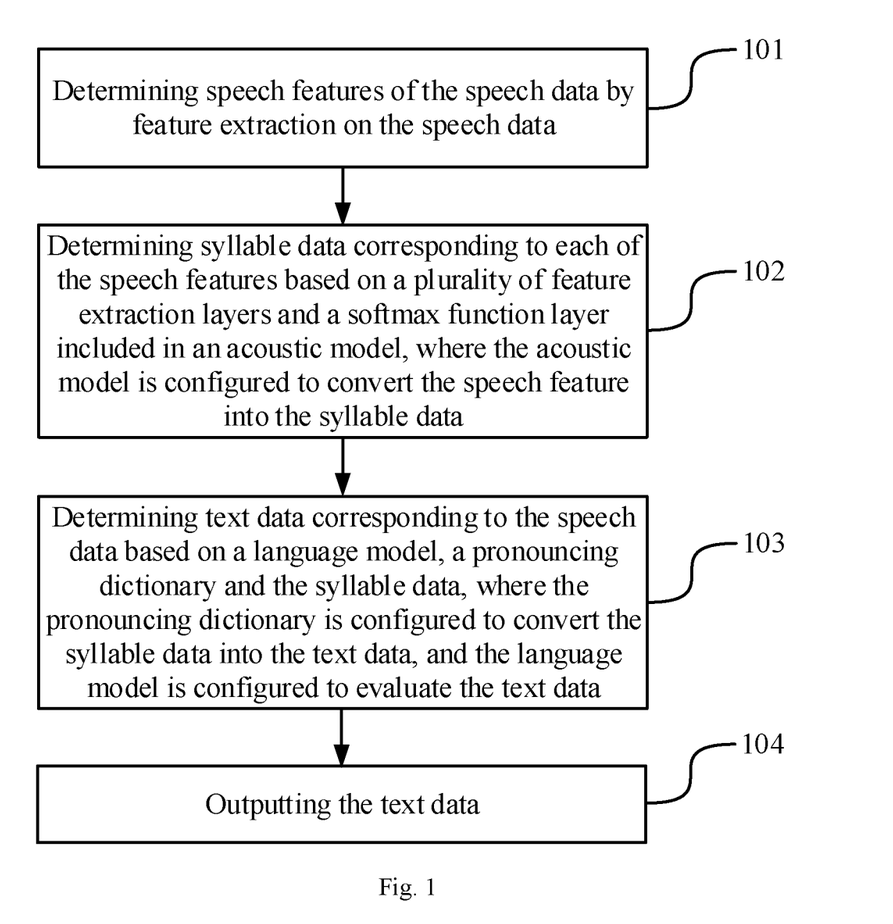
FIG. 1 is a flow chart of a method for speech recognition according to an exemplary embodiment.

FIG. 1 is a flow chart of a method for speech recognition according to an exemplary embodiment, which is applied to a server. As shown in FIG. 1, the method includes the following steps.

Step 101, determining speech features of the speech data by feature extraction on the speech data.

Step 102, determining syllable data corresponding to each of the speech features based on a plurality of feature extraction layers and a softmax function layer included in an acoustic model, where the acoustic model is configured to convert the speech feature into the syllable data.

Step 103, determining text data corresponding to the speech data based on a language model, a pronouncing dictionary and the syllable data, where the pronouncing dictionary is configured to convert the syllable data into the text data, and the language model is configured to evaluate the text data.

Step 104, outputting the text data.

In some embodiments, the step of determining the syllable data includes:

inputting each of the speech features to the acoustic model;

determining the intermediate speech feature extracted from each of the speech features based on the feature extraction layers;

determining, based on the softmax function, a probability that the intermediate speech feature corresponds to each of syllable data in the acoustic model; and determining syllable data with the maximum probability as the syllable data corresponding to the speech feature.

In some embodiments, the method further includes:

acquiring at least one piece of sample data, where each piece of sample data includes a sample speech feature and truth syllable data corresponding to the sample speech feature;

determining the acoustic model by training an initial acoustic model based on predicted syllable data and the truth syllable data, where the predicted syllable data are obtained by inputting the sample speech feature into the initial acoustic model.

In some embodiments, the step of acquiring the sample data includes:

acquiring a first correspondence, a second correspondence and a third correspondence; where the first correspondence is between a first speech feature of a first language and first text data, the second correspondence is between a second speech feature of a second language and second text data, the third correspondence is between first text sub-data and the second text data, and the first text sub-data is a part of data in the first text data;

determining the second text data corresponding to each piece of first text sub-data based on the third correspondence, after selecting a plurality of pieces of first text sub-data randomly from the first text data;

replacing each piece of first text sub-data by the second text data to obtain mixed text data;

determining the mixed text data as the sample text data;

replacing the first speech sub-feature corresponding to each piece of first text sub-data by the second speech feature corresponding to the second text data to obtain the mixed speech feature;

determining the mixed speech feature as the sample speech feature;

determining truth syllable data corresponding to each sample text data; and determining the sample data by combining the truth syllable data, and the sample speech feature.

In some embodiments, the step of determining text data includes:

determining preset text data corresponding to the syllable data based on a fourth correspondence in the pronouncing dictionary, wherein the fourth correspondence is between the syllable data and the text data;

determining a probability of each piece of preset text data based on the language model; and determining the preset text data with the maximum probability as the text data.

In some embodiments, the method further includes:

acquiring sample text corpuses, where the sample text corpuses include text corpuses of the first language and text corpuses of the second language;

determining a plurality of sample words by segmenting sample text corpuses based on a preset algorithm of word segmentation;

determining an occurrence probability that each sample word occurs in the sample text corpuses; and determining the language model by storing each sample word and the occurrence probability corresponding to each sample word into an initial language model.

In some embodiments, the step of determining sample text corpuses includes:

acquiring first text corpuses of the first language, second text corpuses of the second language, and a correspondence between the first text corpuses and the second text corpuses;

selecting at least one first text sub-corpus from each of the first text corpuses;

determining a correspondence between the first text sub-corpus and the second text corpus;

replacing each first text sub-corpus by a second text corpus based on the correspondence between the first text sub-corpuses and the second text corpuses to obtain the mixed text corpuses; and determining the mixed text corpuses as the sample text corpuses.

In some embodiments, the pronouncing dictionary includes a pronouncing dictionary of the first language and a pronouncing dictionary of the second language.

In the embodiment of the present disclosure, the speech features of the speech data are determined according to a feature extraction model, and input to the acoustic model including the plurality of feature extraction layers and the softmax function layer. The syllable data corresponding to the speech features are determined based on the feature extraction layers and the softmax function layer. Then the text data corresponding to the speech data is determined according to the language model, the pronouncing dictionary and the syllable data, and is output finally. In this way, the speech recognition result is determined without a first step of language identification on the speech data. As such, low accuracy for speech recognition due to the low accuracy of language identification is avoided. Moreover, the text data corresponding to the different languages may be relatively accurately distinguished by recognition based on the syllable data, so that the accuracy for speech recognition is improved.

Figure 2:
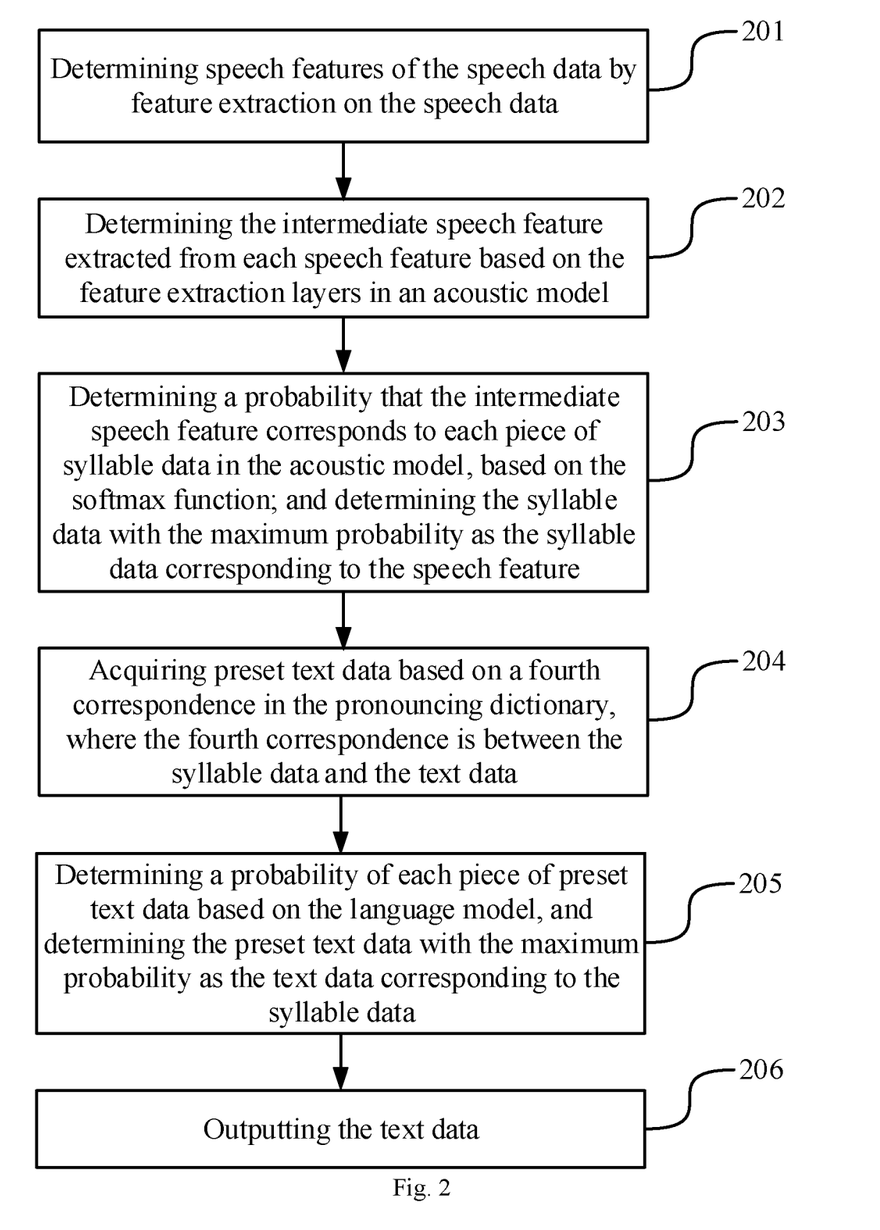
FIG. 2 is a flow chart of another method for speech recognition according to an exemplary embodiment.

FIG. 2 is a flow chart of another method for speech recognition according to an exemplary embodiment, which is applied to an electronic device installed with a system for speech recognition. Here the system for speech recognition includes a feature extraction model, an acoustic model, a language model and a pronouncing dictionary. As shown in FIG. 2, the method includes the following steps.

Step 201, determining speech features of the speech data by feature extraction on the speech data.

In some embodiments, to-be-recognized speech data may be acquired when a user wants to perform speech recognition on a certain segment of the speech data. In some embodiments, the to-be-recognized speech data may be speech data spoken by the user. For example, the electronic device is a terminal, and the user records the speech data by using the terminal. In some embodiments, the to-be-recognized speech data may be a certain segment of audio data. For example, the electronic device is a terminal or a server, and the user inputs the speech data to the electronic device.

The speech data is input to the feature extraction model of the speech recognition system. The feature extraction model may be used for pre-processing such as noise filtration, on the speech data, next, framing the pre-processed speech data to segment the speech data into a plurality of segments, and then, extracting the features of each segment. There are various feature extraction methods, for example, a feature vector of each frame is obtained by using a mel frequency cepstrum coefficient (MFCC) algorithm. Of course, the feature extraction method is only one feasible way listed in the embodiment of the present disclosure, and other feature extraction methods may also be adopted and are not limited in the present disclosure.

Step 202, determining the intermediate speech feature extracted from each speech feature based on the feature extraction layers in an acoustic model.

In some embodiments, the speech features are input to the acoustic model after being obtained through the above-mentioned step 201. The acoustic model includes a plurality of feature extraction layers and a softmax function layer. The feature-extracted speech features (which is referred as the intermediate speech features), is obtained by feature extraction on the speech feature based on the feature extraction layers.

Step 203, determining a probability that the intermediate speech feature corresponds to each piece of syllable data in the acoustic model, based on the softmax function; and determining the syllable data with the maximum probability as the syllable data corresponding to the speech feature.

In a method of recognizing mixed speech, a phoneme is used as a modeling unit and context relevant phonemes are taken into account. In order to realize the short-time stability of the modeling unit, the phoneme may be further divided into three states and even more states during actual modeling. Parameters are shared when a model is output at a phoneme level or a state level. However, modeling in such a way may bring two problems as below.

a) the modeling granularity of the phoneme (and even state) is excessively fine. An obvious difference between different languages gradually appears with the increment of pronunciation granularity. For example, Chinese or English may be easily distinguished by enlarging the granularity to a word level. In addition, a large-granularity modeling unit is more robust and insensitive to differences of environments and speakers. In an existing Chinese and English mixed modeling solution, using the phoneme as the modeling unit is mainly limited by a modeling ability at that time. In recent years, a speech recognition technology based on deep learning rapidly develops, which provides a solution method for modeling an acoustic unit with a larger granularity. As such, new ideas for solving the problem of Chinese and English mixed speech recognition come. Chinese and English syllables are selected as modeling units in this application, and thus, limitations from small-granularity phoneme modeling units are broken.

b) context relevant modeling increases the modeling difficulty. In a phoneme (state)-based modeling method, context relevant modeling is an indispensable method. A phoneme context has to be bound by decision-tree clustering. After Chinese and English phonemes are mixed, a context dependency becomes more complex, and the number of ternary combinations of contexts is increased, so that the context dependency between the two languages becomes very sparse. The context relevant modeling aims at overcoming influences of co-articulation to the phoneme. A syllable is adopted as the modeling unit in the application. Since a syllable unit is more stable in pronunciation and more robust to the change of the context, general context relevant modeling is abandoned, and context-free modeling is adopted, so that influences to Chinese and English mixed speech recognition in the phoneme binding link are avoided.

Therefore, in order to solve the above-mentioned problem, context-free syllable data is adopted as the modeling unit when the acoustic model is established in the embodiment of the present disclosure. In some embodiments, speech data of Chinese and English languages is recognized by the speech recognition system. The context-free tonal syllable data in Chinese is firstly acquired with the amount being determined as 1500. The English speech may be segmented by utilizing a maximum onset principle to obtain 10000 syllable data. Then the Chinese syllable data and English syllable data both are used as the modeling unit to establish the acoustic model.

After the feature-extracted intermediate speech features are obtained through the above-mentioned step 202, the intermediate speech features are input to the softmax layer. Probabilities that the intermediate speech feature corresponds to each piece of the syllable data pre-stored in the acoustic model are calculated based on the softmax function. The probabilities are equivalent to the similarities between the intermediate speech feature and each piece of the syllable data. The higher the probability, the higher the similarity. The maximum probability in all the probabilities and the syllable data with the maximum probability are determined, here the syllable data has the highest similarity with the intermediate speech feature. Such syllable data is determined as the syllable data corresponding to the above-mentioned speech feature.

Figure 3:
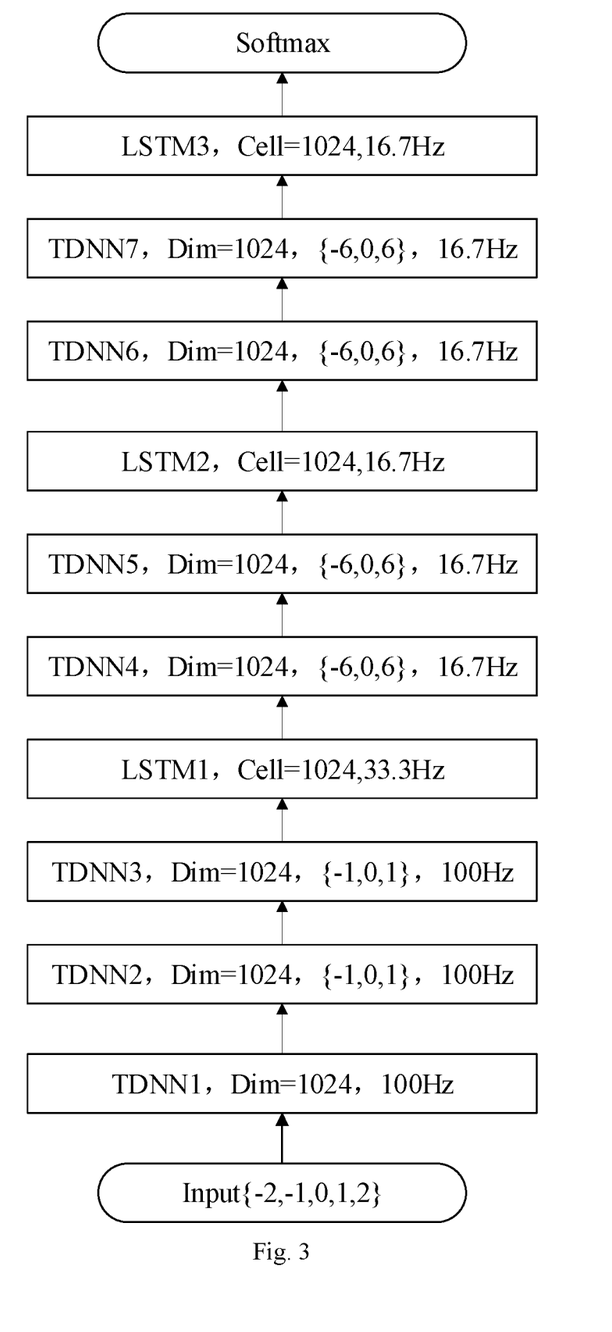
FIG. 3 is a structural diagram of a speech recognition model according to an exemplary embodiment.

In some embodiments, the above-mentioned acoustic model may adopt various models, the modeling unit with the larger granularity is adopted in the embodiment of the present disclosure (modeling based on the syllable data). Therefore, the acoustic model is required to be capable of catching a more duration and has a stronger long-term track modeling ability. A chain modeling method may be selected in the embodiment of the present disclosure, and the method is also known as a lattice-free maximum mutual information method. On the aspect of a model structure, a time delay neural network-long short-term memory (TDNN-LSTM)

model may be adopted. In some embodiments, as shown in FIG. 3, the model may adopt a structure that seven layers of TDNNs and three layers of LSTMs are alternately placed. Based on such a structure, speech features of a current frame, speech features of a previous frame, speech features of first two frames, speech features of a next frame and speech features of last two frames are input to the acoustic model and are respectively denoted by "−2", "−1", "0", "1" and "2". After the speech features are input to the acoustic model, the input speech features are respectively extracted by three TDNN layers (namely TDNN1, TDNN2 and TDNN3). Here 1024 shows that there are 1024 neurons on each layer, and 100 Hz shows that the sampling rate is 100 Hz. Then, features of intermediate data output by a previous layer are extracted by one LSTM layer (namely LSTM1), speech features of previous six frames and next six frames of the current frame are acquired in historical data and are jointly input to the next TDNN layer (namely TDNN4). The speech features of the current frame, the speech features of the previous six frames and the speech features of the next six frames are extracted, an obtained result is input to the next TDNN layer (TDNN5) for feature extraction. The intermediate data output from TDNN5 is input to the next LSTM layer (namely LSTM2) for feature extraction and feature selection. The intermediate data output from LSTM2 is input to the next TDNN layer (namely TDNN6, TDNN 7) for further feature extraction. The obtained intermediate data is input into the next LSTM layer (namely LSTM3) for feature extraction and feature selection. The data output from the LSTM3 is input into the softmax layer and is calculated to obtain probabilities that the current frame corresponds to each piece of the pre-stored syllable data, the maximum probability is determined, and the syllable data with the maximum probability is determined as the syllable data corresponding to the speech feature of the current frame.

Step 204, acquiring preset text data based on a fourth correspondence in the pronouncing dictionary, where the fourth correspondence is between the syllable data and the text data.

In some embodiments, after being obtained through the above-mentioned steps, the syllable data is respectively input to the pronouncing dictionary and the language model. Where the fourth correspondence between the syllable data and the text data is stored in the pronouncing dictionary. Generally, one piece of syllable data may correspond to a plurality of pieces of text data. Each piece of syllable data is searched, and the plurality of piece of text data (which may also be known as the preset text data) is determined.

It should be noted that the speech recognition model in the embodiment of the present disclosure may recognize speech data including a plurality of languages. Therefore, the pronouncing dictionary is required to include a pronouncing dictionary of a recognizable language. In some embodiments, when the speech recognition system may recognize speech data in a first language and speech data in a second language, the pronouncing dictionary of the speech recognition system includes a pronouncing dictionary of the first language and a pronouncing dictionary of the second language, which can be existing available pronouncing dictionaries. For example, when the speech recognition system is a system for recognizing Chinese and English mixed speech data, the pronouncing dictionary may include an existing Chinese pronouncing dictionary and English pronouncing dictionary.

Step 205, determining a probability of each piece of preset text data based on the language model, and determining the preset text data with the maximum probability as the text data corresponding to the syllable data.

In some embodiments, according to the above-mentioned steps, a plurality of text statements composed of the different preset text data may be determined. The plurality of preset text data is input to the language model which is a probability model for calculating an occurrence probability of one text statement. The language model is mainly used for determining which text data sequence is most possible or predicting a next word to appear under the condition that several words appear. In other words, the language model is used for restricting word search.

The probability of each of the preset text data is determined based on the language model, and the preset text data with the maximum probability is determined as the text data corresponding to the syllable data.

Step 206, outputting the text data.

In some embodiments, the language model outputs the text data after determining the text data. If the electronic device is the server, the electronic device transmits the text data to the terminal operated by the user, so that the terminal displays the text data to the user. If the electronic device is the terminal, the electronic device directly displays the text data to the user.

In the embodiment of the present disclosure, the features of the speech data are extracted based on the feature extraction model to obtain the speech features; the syllable data corresponding to the speech features are determined based on the feature extraction layers and the softmax function layer included in the acoustic model after inputting the speech features into the acoustic model; the text data corresponding to the speech data is determined based on the language model, the pronouncing dictionary and the syllable data, and is output finally. In this way, the speech recognition result is determined without a first step of language identification on the speech data. As such, low accuracy for speech recognition due to the low accuracy of language identification is avoided. Moreover, the text data corresponding to the different languages may be relatively accurately distinguished by recognition based on the syllable data, so that the accuracy for speech recognition is improved.

Figure 4:
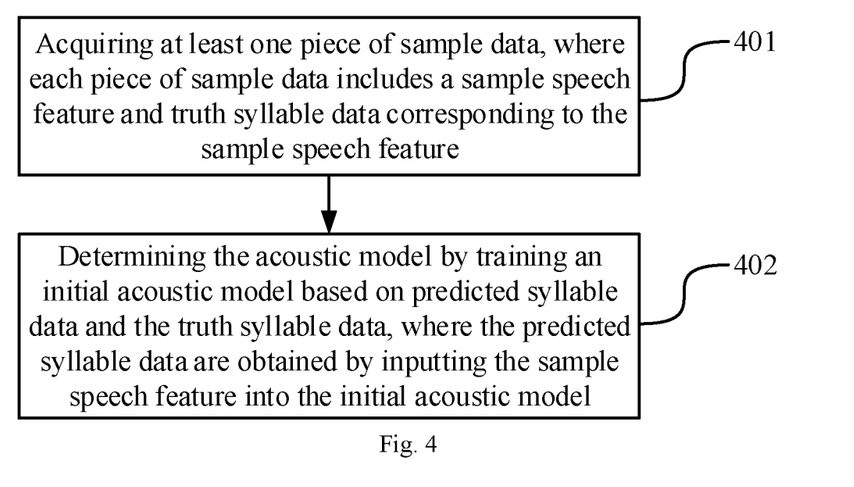
FIG. 4 is a flow chart of another method for speech recognition according to an exemplary embodiment.

FIG. 4 is a flow chart of another method for speech recognition according to an exemplary embodiment, which is used for training an acoustic model. As shown in FIG. 4, the method includes the following steps.

Step 401, acquiring at least one piece of sample data, where each piece of sample data includes a sample speech feature and truth syllable data corresponding to the sample speech feature.

Existing sample data for training the acoustic model is less, and the main reason for the scarcity of Chinese and English mixed acoustic data lies in that: 1) real data is difficult to collect. An online system is poor in recognition performance on mixed Chinese and English speech and thus relatively poor in user experience. Generally Chinese and English mixed speech is few, so that such speech data are rarely from real users; and 2) the transcription cost is relatively high. Generally Chinese and English mixed text data is firstly required to be prepared before transcription. However, such text data is difficult to acquire, and the main reason lies in that: a mixed text is easier to appear in an oral form and rarely appears in a written form. As such it is very difficult to collect the mixed text data. In order to solve the above-mentioned problem, the sample data may be built by adopting the following steps 4011-4015.

Step 4011, acquiring a first correspondence between a first speech feature of a first language and first text data, a second correspondence between a second speech feature of a second language and second text data and a third correspondence between first text sub-data and the second text data, where the first text sub-data is a part of data in the first text data.

Step 4012, determining the second text data corresponding to each piece of first text sub-data based on the third correspondence, after selecting a plurality of pieces of first text sub-data randomly from the first text data.

Step 4013, replacing each piece of first text sub-data by the second text data to obtain mixed text data, and determining the mixed text data as the sample text data.

Step 4014, replacing the first speech sub-feature corresponding to each piece of first text sub-data by the second speech feature corresponding to the second text data to obtain the mixed speech feature, and determining the mixed speech feature as the sample speech feature.

Step 4015, determining truth syllable data corresponding to each sample text data.

Step 4016, determining the sample data by combining the truth syllable data, and the sample speech feature.

In some embodiments, the above-mentioned speech recognition model is a model for recognizing Chinese and English speech data. The training sample of the acoustic model is composed of three parts: pure Chinese speech data, pure English speech data and artificially generated Chinese and English mixed speech data. Here a method for generating the mixed speech data is based on forced alignment in a word-level and includes the steps.

a) Training two acoustic models based on speech data in Chinese and English separately, and determining the alignment relationships in the word-level respectively.

b) Selecting one Chinese speech feature and the text data, selecting a certain Chinese word and speech feature randomly in a Chinese speech feature-text data pair based on the alignment relationship, and replacing the Chinese word and speech feature with a certain English word and English feature; or selecting a position randomly for inserting a certain English word and speech feature. In some embodiments, the semantic similarity is not needed to be taken into account during replacement.

Step 402, determining the acoustic model by training an initial acoustic model based on predicted syllable data and the truth syllable data, where the predicted syllable data are obtained by inputting the sample speech feature into the initial acoustic model.

In some embodiments, with one piece of sample data in the plurality of pieces of sample data as an example. The sample speech feature in the sample data is input to the initial acoustic model to output the predicted syllable data. An error is calculated by comparing the predicted syllable data and the truth syllable data in the sample data. Then, parameters in the initial acoustic model are reversely adjusted according to the error. Repeated training is performed by using the plurality of sample data with reference to the above-mentioned training method until the error is smaller than a preset error or is reduced. In this way, an obtained acoustic model is a trained acoustic model.

It should be noted that the above-mentioned training method is only a basic training method, and other training ways may also be adopted. In some embodiments, in order to ensure the accuracy for speech recognition, chain modeling may be adopted. In this way, the acoustic model may be trained based on a method by which a chain model is trained. Here the method includes the following steps.

a) Training any one of existing Chinese and English mixed context-free GMM models based on the above-mentioned acoustic training sample data.

b) Generating alignment and lattice (namely a grid of a word generated in a decoding process) for each statement based on the trained GMM model; and c) Training the acoustic model based on the alignment, lattice and speech features. Here the training process may be an existing training way, the descriptions thereof are omitted in the present disclosure.

In the embodiment of the present disclosure, in order to solve the problem of insufficiency of acoustic speech training sample data, a method for generating Chinese and English mixed speech data based forced-alignment is adopted. In this way, a great deal of sample data may be built to training the acoustic model. As such, the acoustic model may be better trained, the trained acoustic model is more accurate, and thus the accuracy for speech recognition is improved.

Figure 5:
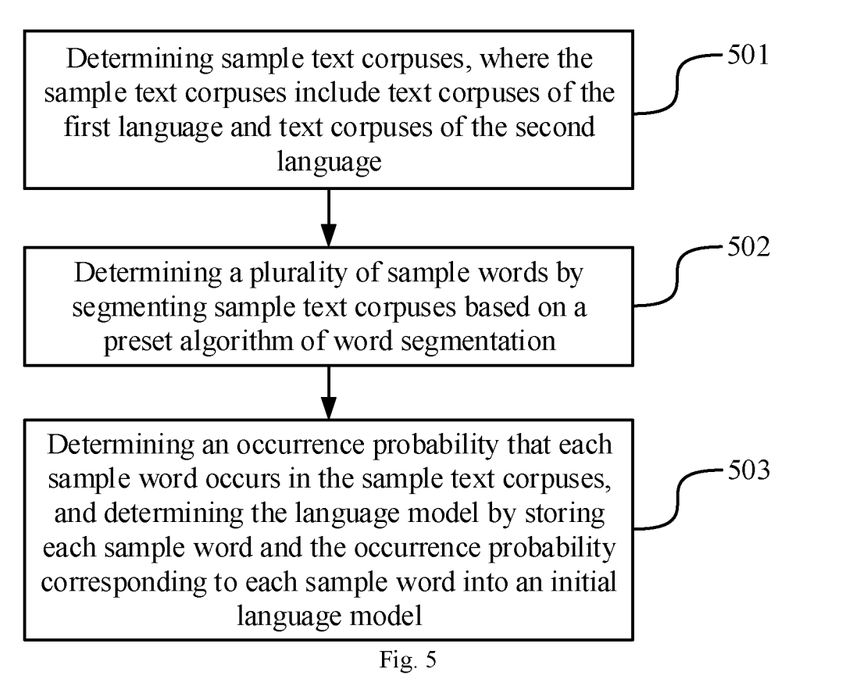
FIG. 5 is a flow chart of yet another method for speech recognition according to an exemplary embodiment.

FIG. 5 is a flow chart of another method for speech recognition according to an exemplary embodiment, which is used for training a language model. As shown in FIG. 5, the method includes the following steps.

Step 501, determining sample text corpuses, where the sample text corpuses include text corpuses of the first language and text corpuses of the second language.

In some embodiments, the method of determining sample text corpuses includes the following steps 5011-5013.

Step 5011, acquiring first text corpuses of the first language, second text corpuses of the second language, and a correspondence between the first text corpuses and the second text corpuses.

Step 5012, selecting at least one first text sub-corpus from each of the first text corpuses, and determining a correspondence between the first text sub-corpus and the second text corpus.

Step 5013, replacing each first text sub-corpus by a second text corpus based on the correspondence between the first text sub-corpuses and the second text corpuses to obtain the mixed text corpuses, and determining the mixed text corpuses as the sample text corpuses.

In some embodiments, the above-mentioned speech recognition model is used for recognizing Chinese and English speech data, and large-scale Chinese and English mixed text data is built based on Chinese and English parallel corpuses. The buildon method includes the following.

a) Building a parallel corpus of aligned phrases. In some embodiments, a great number of parallel sentence pairs exist in Chinese-to-English machine translation, and the parallel corpuses can be built based on the the parallel sentence pairs.

b) Generating mixed corpuses based on the parallel corpus and a monolingual corpus. In some embodiments, parts of words in a Chinese text are randomly selected and are replaced with words of another language according to the parallel corpus. The process is executed repeatedly until a large enough number of text corpuses are generated.

Step 502, determining a plurality of sample words by segmenting sample text corpuses based on a preset algorithm of word segmentation.

Step 503, determining an occurrence probability that each sample word occurs in the sample text corpuses, and determining the language model by storing each sample word and the occurrence probability corresponding to each sample word into an initial language model.

It should be noted that the language model may be trained by using an N-gram method of KN interpolation or other feasible training ways, the limitations thereof are omitted in the present disclosure.

Figure 6:
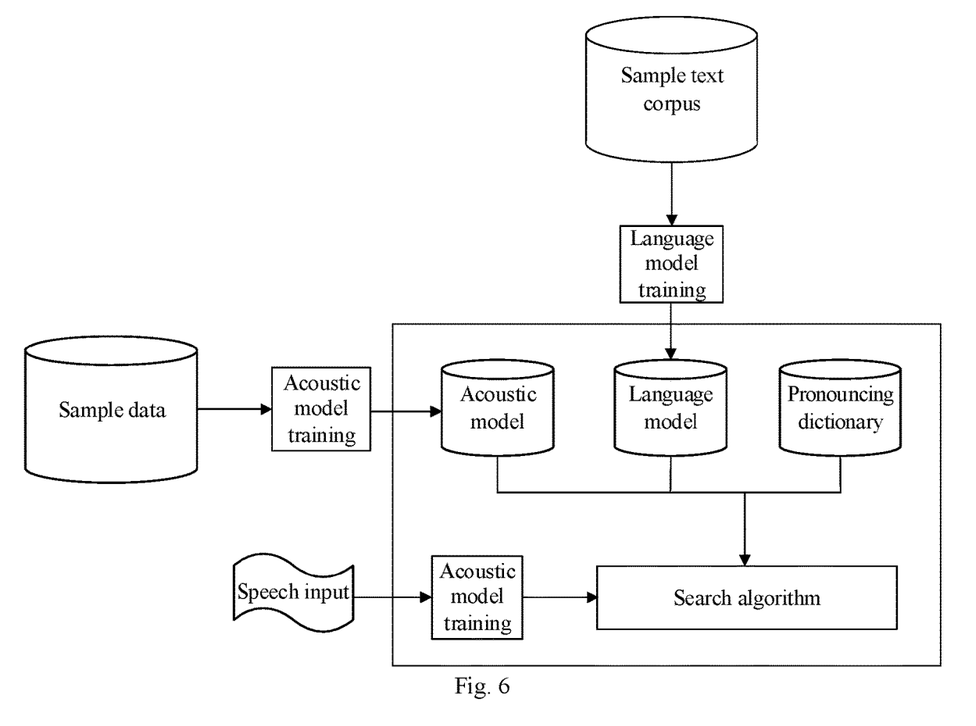
FIG. 6 is a structural diagram of a system for speech recognition according to an exemplary embodiment.

In some embodiments, the structure of each model and training sample included by the above-mentioned speech recognition system may be shown as FIG. 6. In this way, not only the problem of insufficiency of training data of an acoustic model for mixed language is solved, but also the problem of insufficiency of training data of a mixed language model is solved, and the accuracy for speech recognition is improved.

An embodiment of the present disclosure further provides a system for speech recognition. The system includes a feature extraction module, an acoustic model, a language model and a pronouncing dictionary.

The feature extraction module is configured to determine speech features of the speech data by feature extraction on the speech data.

The acoustic model is configured to determine syllable data corresponding to each of the speech features based on a plurality of feature extraction layers and a softmax function layer included in an acoustic model.

The language model and the pronouncing dictionary are configured to text data corresponding to the speech data.

The language model is further configured to output the text data.

In the embodiment of the present disclosure, the speech features of the speech data are determined according to a feature extraction model, and input to the acoustic model including the plurality of feature extraction layers and the softmax function layer. The syllable data corresponding to the speech features are determined based on the feature extraction layers and the softmax function layer. Then the text data corresponding to the speech data is determined according to the language model, the pronouncing dictionary and the syllable data, and is output finally. In this way, the speech recognition result is determined without a first step of language identification on the speech data. As such, low accuracy for speech recognition due to the low accuracy of language identification is avoided. Moreover, the text data corresponding to the different languages may be relatively accurately distinguished by recognition based on the syllable data, so that the accuracy for speech recognition is improved.

Figure 7:
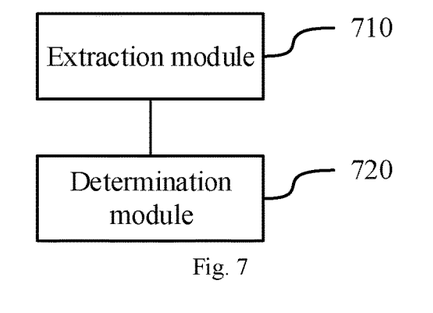
FIG. 7 is a block diagram of a device for speech recognition according to an exemplary embodiment.

FIG. 7 is a block diagram of a device for speech recognition according to an exemplary embodiment. As shown FIG. 7, the device includes an extraction module 710 and a determination module 720.

The extraction module 720 is configured to determine speech features of the speech data by feature extraction on the speech data.

The determination module 720 is configured to determine syllable data corresponding to each of the speech features based on a plurality of feature extraction layers and a softmax function layer included in an acoustic model, where the acoustic model is configured to convert the speech feature into the syllable data.

The determination module 720 is further configured to determine text data corresponding to the speech data based on a language model, a pronouncing dictionary and the syllable data, where the pronouncing dictionary is configured to convert the syllable data into the text data, and the language model is configured to evaluate the text data.

In some embodiments, the determination module 720 is configured to:

inputting each of the speech features to the acoustic model;

determining the intermediate speech feature extracted from each of the speech features based on the feature extraction layers;

determining, based on the softmax function, a probability that the intermediate speech feature corresponds to each piece of syllable data in the acoustic model; and determining the syllable data with the maximum probability as the syllable data corresponding to the speech feature.

In some embodiments, the device further includes:

an acquisition module 730 configured to acquire at least one piece of sample data, where each piece of sample data includes a sample speech feature and truth syllable data corresponding to the sample speech feature; and a training module 740 configured to determine the acoustic model by training an initial acoustic model based on predicted syllable data and the truth syllable data, where the predicted syllable data are obtained by inputting the sample speech feature into the initial acoustic model.

In some embodiments, the acquisition module 730 is configured to:

acquiring a first correspondence, a second correspondence and a third correspondence; where the first correspondence is between a first speech feature of a first language and first text data, the second correspondence is between a second speech feature of a second language and second text data, the third correspondence is between first text sub-data and the second text data, and the first text sub-data is a part of data in the first text data;

determining the second text data corresponding to each piece of first text sub-data based on the third correspondence, after selecting a plurality of pieces of first text sub-data randomly from the first text data;

replacing each piece of first text sub-data by the second text data to obtain mixed text data;

determining the mixed text data as the sample text data;

replacing the first speech sub-feature corresponding to each piece of first text sub-data by the second speech feature corresponding to the second text data to obtain the mixed speech feature;

determining the mixed speech feature as the sample speech feature;

determining truth syllable data corresponding to each sample text data; and determining the sample data by combining the truth syllable data, and the sample speech feature.

In some embodiments, the determination module 720 is configured to:

determining preset text data corresponding to the syllable data based on a correspondence between the syllable data and the text data in the pronouncing dictionary;

determining a probability of each piece of preset text data based on the language model; and determining the preset text data with the maximum probability as the text data.

In some embodiments, the acquisition module 730 is further configured to determine sample text corpuses, where the sample text corpuses include text corpuses of the first language and text corpuses of the second language;

and the device further includes:

a processing module 750 configured to determine a plurality of sample words by segmenting sample text corpuses based on a preset algorithm of word segmentation; and a storage module 760 configured to determine an occurrence probability that each sample word occurs in the sample text corpuses, and determine the language model by storing each sample word and the occurrence probability corresponding to each sample word into an initial language model.

In some embodiments, the acquisition module 730 is configured to:

acquiring first text corpuses of the first language, second text corpuses of the second language, and a correspondence between the first text corpuses and the second text corpuses;

selecting at least one first text sub-corpus from each of the first text corpuses;

determining a correspondence between the first text sub-corpus and the second text corpus;

replacing each first text sub-corpus by a second text corpus based on the correspondence between the first text sub-corpuses and the second text corpuses to obtain the mixed text corpuses; and determining the mixed text corpuses as the sample text corpuses.

In some embodiments, the pronouncing dictionary includes a pronouncing dictionary of the first language and a pronouncing dictionary of the second language.

In the embodiment of the present disclosure, the speech features of the speech data are determined according to a feature extraction model, and input to the acoustic model including the plurality of feature extraction layers and the softmax function layer. The syllable data corresponding to the speech features are determined based on the feature extraction layers and the softmax function layer. Then the text data corresponding to the speech data is determined according to the language model, the pronouncing dictionary and the syllable data, and is output finally. In this way, the speech recognition result is determined without a first step of language identification on the speech data. As such, low accuracy for speech recognition due to the low accuracy of language identification is avoided. Moreover, the text data corresponding to the different languages may be relatively accurately distinguished by recognition based on the syllable data, so that the accuracy for speech recognition is improved.

Figure 8:
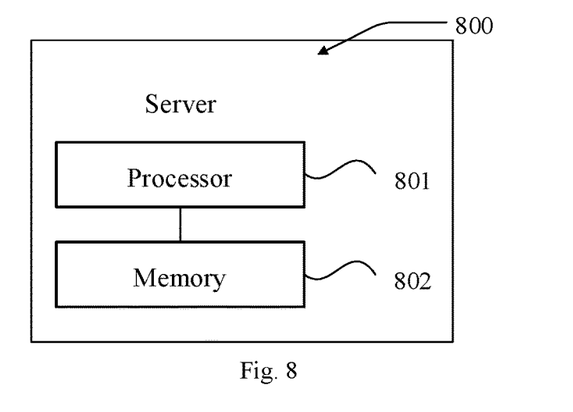
FIG. 8 is a structural block diagram of an electronic device according to an exemplary embodiment.

FIG. 8 is a structural diagram of an electronic device provided by an embodiment of the present disclosure. In some embodiments, the electronic device may be a server 800. The structures of server 800 may have great difference due to different configurations or performances. As shown in FIG. 8, the server 800 includes one or more central processing units (CPU) 801 and one or more memories 802, where the memories 802 store at least one instruction, and the at least one instruction is loaded and executed by the processors 801 to implement the above-mentioned method for speech recognition. Of course, the electronic device may further be provided with a component such as a wired or wireless network interface, a keyboard and an input/output interface so as to facilitate input/output, and the electronic device may further include other components for realizing functions of the device, the descriptions thereof are omitted herein.

The server 800 may be configured to execute steps of the above-mentioned method for speech recognition.

Figure 9:
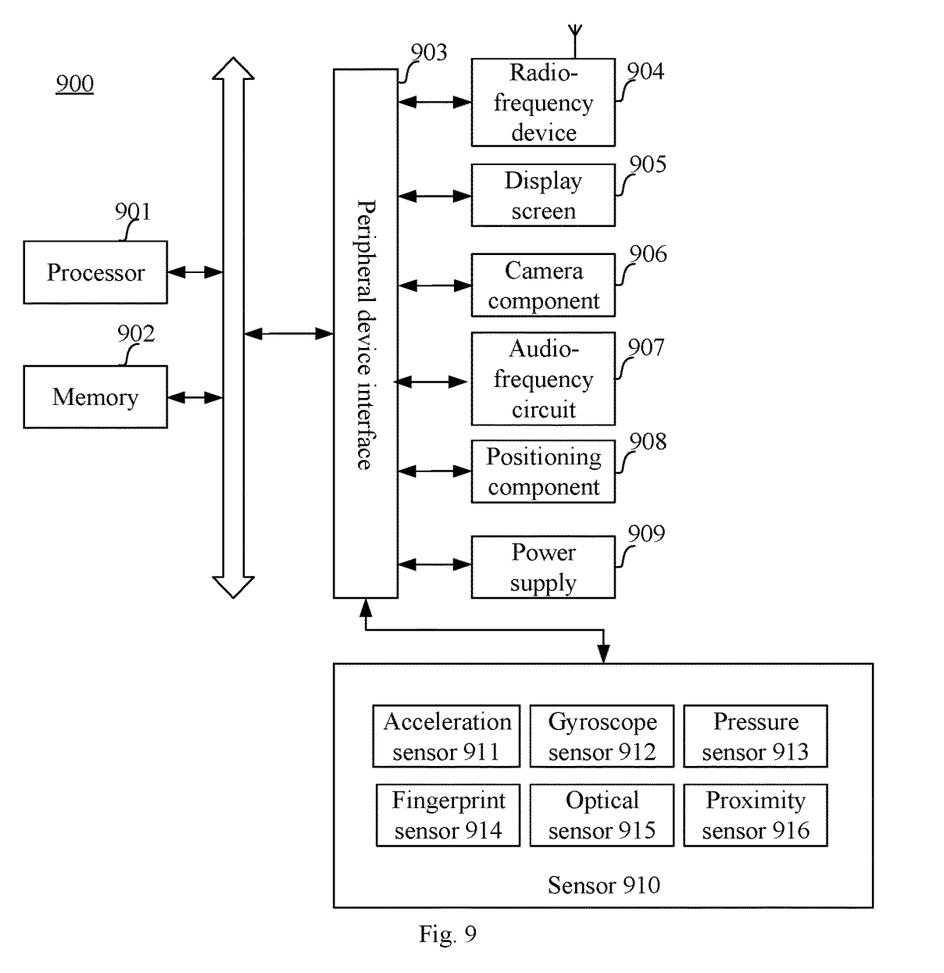
FIG. 9 is a structural block diagram of another electronic device according to an exemplary embodiment.

FIG. 9 is a structural diagram of another electronic device provided by an embodiment of the present disclosure. In some embodiments, the electronic device may be a terminal 900 such as a smart phone and a tablet personal computer. In some embodiments, the terminal 900 may also be known as a user device, a portable terminal or other names.

Generally, as shown in FIG. 9, the terminal 900 includes a processor 901 and a memory 902.

The processor 901 may include one or more processing cores such as a four-core processor and an eight-core processor. The processor 901 may be implemented by adopting at least one hardware form of digital signal processing (DSP), a field-programmable gate array (FPGA) and a programmable logic array (PLA). The processor 901 may further include a main processor and a coprocessor, the main processor is a processor for processing data in an awake state and is also known as a central processing unit (CPU); and the coprocessor is a low-power-consumption processor for processing data in a standby state. In some embodiments, the processor 901 may be integrated with a graphics processing unit (GPU), and the GPU is configured to take charge of rendering and drawing a content required to be displayed by a display screen. In some embodiments, the processor 901 may further include an artificial intelligence (AI) processor, and the AI processor is configured to process calculation operation related to machine learning.

The memory 902 may include one or more computer readable storage media which may be tangible and non-transient. The memory 902 may further include a high-speed random access memory and a non-volatile memory such as one or more disk storage devices and flash memory devices. In some embodiments, a non-transient computer readable storage medium in the memory 902 is configured to store at least one instruction, and the at least one instruction is configured to be executed by the processor 901 to implement the method for speech recognition provided in this application.

In some embodiments, the terminal 900 may optically include a peripheral device interface 903 and at least one peripheral device. In some embodiments, the peripheral device includes at least one of a radio-frequency circuit 904, a touch display screen 905, a camera 906, an audio-frequency circuit 907, a positioning component 908 and a power supply 909.

The peripheral device interface 903 may be configured to connect at least one peripheral device related to input/output (I/O) to the processor 901 and the memory 902. In some embodiments, the processor 901, the memory 902 and the peripheral device interface 903 are integrated on the same chip or circuit board; and in some other embodiments, any one or two of the processor 901, the memory 902 and the peripheral device interface 903 may be implemented on a single chip or circuit board, the limitations thereof are omitted in the present embodiment.

The radio-frequency circuit 904 is configured to receive and transmit a radio frequency (RF) signal which is also known as an electromagnetic signal. The radio-frequency circuit 904 performs communication with a communication network and other communication devices through the electromagnetic signal. The radio-frequency circuit 904 converts an electric signal into the electromagnetic signal to be transmitted or converts the received electromagnetic signal into the electric signal. In some embodiments, the radio-frequency circuit 904 includes an antenna system, an RF transceiver, one or more amplifier, a tuner, an oscillator, a digital signal processor, a coding and decoding chipset, a user identity module card and the like. The radio-frequency circuit 904 may perform communication with other terminals through at least one wireless communication protocol. The wireless communication protocol includes, but is not limited to a world wide web, a metropolitan area network, an interne, each-generation mobile communication network (2G, 3G, 4G and 5G), a wireless local area network and/or a wireless fidelity (WiFi) network. In some embodiments, the radio-frequency circuit 904 may further include a near field communication (NFC) related circuit, the limitations thereof are omitted in this application.

The touch display screen 905 is configured to display a user interface (UI). The UI may include a graph, a text, an icon, a video and any combinations thereof. The touch display screen 905 is also capable of acquiring a touch signal on the surface or above the surface of the touch display screen 905. The touch signal may be used as a control signal to be input to the processor 901 so as to be processed. The touch display screen 905 is configured to provide a virtual button and/or a virtual keyboard also known as a soft button and/or a soft keyboard. In some embodiments, one touch display screen 905 may be provided and arranged on a front panel of the terminal 900; in some other embodiments, at least two touch display screens 905 may be provided and respectively arranged on different surfaces of the terminal 900 or designed to be folded; and in some another embodiments, the touch display screen 905 may be a flexible display screen and is arranged on a bent surface or folded surface of the terminal 900. Even, the touch display screen 905 may be arranged in a non-rectangular irregular figure, namely a special-shaped screen. The touch display screen 905 may be made of a liquid crystal display (LCD), an organic light-emitting diode (OLED) and the like.

The camera component 906 is configured to acquire an image or a video. In some embodiments, the camera component 906 includes a front camera and a rear camera. Generally, the front camera is configured to realize video telephony or selfie, and the rear camera is configured to realize photo or video shooting. In some embodiments, at least two rear cameras are provided and are respectively any one of a main camera, a depth-of-field camera and a wide-angle camera. As such, the main camera and the depth-of-field camera are integrated to achieve a background delexicalization function, and the main camera and the wide-angle camera are integrated to achieve pan-shooting and virtual reality (VR) shooting functions. In some embodiments, the camera component 906 may further include a flashlight. The flashlight may be a single-color-temperature flashlight or a double-color-temperature flashlight. The double-color-temperature flashlight refers to a combination of a warm-light flashlight and a clod-light flashlight and may be used for light compensation at different color temperatures.

The audio-frequency circuit 907 is configured to provide an audio interface between a user and the terminal 900. The audio-frequency circuit 907 may include a microphone and a loudspeaker. The microphone is configured to acquire sound waves of the user and an environment and convert the sound waves into electric signals to be input to the processor 901 to be processed or input to the radio-frequency circuit 904 to realize voice communication. For the purpose of stereophonic sound acquisition or noise reduction, a plurality of microphones may be provided and respectively arranged on different parts of the terminal 900. The microphone may also be an array microphone or an omnidirectional acquisition microphone. The loudspeaker is configured to convert the electric signals from the processor 901 or the radio-frequency circuit 904 into the sound waves. The loudspeaker may be a traditional thin film loudspeaker or a piezoceramic loudspeaker. When the loudspeaker is the piezoceramic loudspeaker, the electric signals not only may be converted into sound waves heard by human beings, but also may be converted into sound waves not heard by the human beings so as to be used for ranging. In some embodiments, the audio-frequency circuit 907 may also include a headset jack.

The positioning component 908 is configured to locate the current geographic position of the terminal 900 so as to realize navigation or location based service (LBS). The positioning component 908 may be based on a global positioning system (GPS) of America, a Big Dipper system of China and a Galileo system of Russia.

The power supply 909 is configured to supply power for each component in the terminal 900. The power supply 909 may be alternating current, direct current, a disposable battery or a rechargeable battery. When the power supply 909 includes the rechargeable battery, the rechargeable battery may be a wired charging battery or wireless charging battery. The wired charging battery is charged by virtue of a wired circuit, and the wireless charging battery is charged by virtue of a wireless coil. The rechargeable battery may be further configured to support a fast charging technology.

In some embodiments, the terminal 900 further includes one or more sensors 910. The one or more sensors 910 include, but are not limited to an acceleration sensor 911, a gyroscope sensor 912, a pressure sensor 913, a fingerprint sensor 914, an optical sensor 915 and a proximity sensor 916.

The acceleration sensor 911 may detect accelerations on three coordinate axes of a coordinate system established by the terminal 900. For example, the acceleration sensor 911 may be configured to detect components of a gravitational acceleration on the three coordinate axes. The processor 901 may control the touch display screen 905 to display a user interface with a horizontal view or a longitudinal view according to a gravitational acceleration signal acquired by the acceleration sensor 911. The acceleration sensor 911 may be further configured to acquire movement data of a game or the user.

The gyroscope sensor 912 may detect an engine body direction and rotation angle of the terminal 900 and may be cooperated with the acceleration sensor 911 to acquire a 3D action of the user to the terminal 900. The processor 901 may achieve the following functions: action induction (for example, the UI is changed according to tilt operation of the user), image stabilization during shooting, game control and inertial navigation according to data acquired by the gyroscope sensor 912.

The pressure sensor 913 may be arranged on a side frame of the terminal 900 and/or a lower layer of the touch display screen 905. When the pressure sensor 913 is arranged on the side frame of the terminal 900, a holding signal of the user for the terminal 900 may be detected, and left/right hand recognition or fast operation may be performed according to the holding signal. When the pressure sensor 913 is arranged on the lower layer of the touch display screen 905, an operable control on the UI may be controlled according to the pressure operation of the user for the touch display screen 905. The operable control includes at least one of a button control, a scroll bar control, an icon control and a menu control.

The fingerprint sensor 914 is configured to acquire a fingerprint of the user, so that the identity of the user is recognized according to the acquired fingerprint. When the identity of the user is recognized to be a trusted identity, the processor 901 authorizes the user to execute relevant sensitive operations including screen unlocking, encrypted information viewing, software downloading, payment, setting alteration and the like. The fingerprint sensor 914 may be arranged on the front, back or side of the terminal 900. When the terminal 900 is provided with a physical button or manufacturer logo, the fingerprint sensor 914 may be integrated with the physical button or manufacturer logo.

The optical sensor 915 is configured to acquire ambient light intensity. In one embodiment, the processor 901 may control the display brightness of the touch display screen 905 according to the ambient light intensity acquired by the optical sensor 915. In some embodiments, when the ambient light intensity is relatively high, the display brightness of the touch display screen 905 is increased; and when the ambient light intensity is relatively low, the display brightness of the touch display screen 905 is regulated to be lowered. In another embodiment, the processor 901 may further dynamically regulate shooting parameters of the camera component 906 according to the ambient light intensity acquired by the optical sensor 915.

The proximity sensor 916 is also known as a range sensor and is generally arranged in the front of the terminal 900. The proximity sensor 916 is configured to acquire a distance from the user to the front of the terminal 900. In one embodiment, when the proximity sensor 916 detects that the distance from the user to the front of the terminal 900 is gradually shortened, the processor 901 controls the touch display screen 905 to switch from an on-screen state to an off-screen state; and when the proximity sensor 916 detects that the distance from the user to the front of the terminal 900 is gradually increased, the processor 901 controls the touch display screen 905 to switch from the off-screen state to the on-screen state.

It can be understood by the skilled in the art that the structure as shown in FIG. 9 does not build a limitation to the terminal 900 and may include more or less components than those shown in the figure, or be combined with some components or be arranged by adopting different components.

In an exemplary embodiment, a non-transitory computer readable storage medium is provided. The storage medium stores at least one instruction, and the at least one instruction is loaded and executed by a processor to implement the method for speech recognition in the above-mentioned embodiment. In some embodiments, the computer readable storage medium may be an ROM, a random access memory (RAM), a CD-ROM, a magnetic tape, a floppy disk, an optical data storage medium and the like.

In an exemplary embodiment, an application program including one or more instructions is provided. The one or more instructions may be executed by a processor of an electronic device to implement the above-mentioned method for speech recognition. In some embodiments, the above-mentioned instructions may also be executed by the processor of the electronic device to implement other steps related to the above-mentioned exemplary embodiments.

Other implementation solutions will be readily envisioned by those skilled in the art after considering the specification and putting the present disclosure disclosed herein into practice. This application aims at covering any variations, purposes or adaptive changes of the present disclosure, and these variations, purposes or adaptive changes conform to a general principle of the present disclosure and include common general knowledge or conventional technical means in the undisclosed technical field of the present disclosure. The specification and the embodiments are merely regarded to be exemplary, and the true scope and spirit of the present disclosure are appointed by the following claims.

It should be understood that the present disclosure is not limited to precise structures which have been described above and shown in the accompanying drawings, and various modifications and alterations may be made without departing from the scope thereof. The scope of the present disclosure is merely limited by the appended claims

We claim:

1. A method for speech recognition, comprising:
   determining speech features of speech data by feature extraction on the speech data;
   determining syllable data corresponding to each of the speech features based on a plurality of feature extraction layers and a softmax function layer included in an acoustic model, wherein the acoustic model is configured to convert the speech feature into the syllable data;
   determining text data corresponding to the speech data based on a language model, a pronouncing dictionary and the syllable data, wherein the pronouncing dictionary is configured to convert the syllable data into the text data, and the language model is configured to evaluate the text data; and
   outputting the text data;
   wherein the method further comprises:
   acquiring at least one piece of sample data, wherein each piece of sample data includes a sample speech feature and truth syllable data corresponding to the sample speech feature;
   determining the acoustic model by training an initial acoustic model based on predicted syllable data and the truth syllable data, wherein the predicted syllable data are obtained by inputting the sample speech feature into the initial acoustic model;
   wherein acquiring the sample data comprises:
   acquiring a first correspondence, a second correspondence and a third correspondence; wherein the first correspondence is between a first speech feature of a first language and first text data, the second correspondence is between a second speech feature of a second language and second text data, the third correspondence is between first text sub-data and the second text data, and the first text sub-data is a part of data in the first text data;
   determining second text data corresponding to each piece of first text sub-data based on the third correspondence, after selecting a plurality of pieces of first text sub-data randomly from the first text data;
   replacing each piece of first text sub-data by the second text data to obtain mixed text data;
   determining the mixed text data as the sample text data;
   replacing the first speech sub-feature corresponding to each piece of first text sub-data by the second speech feature corresponding to the second text data to obtain a mixed speech feature;
   determining the mixed speech feature as the sample speech feature;
   determining truth syllable data corresponding to each sample text data; and
   determining the sample data by combining the truth syllable data, and the sample speech feature.

2. The method according to claim 1, wherein determining the syllable data comprises:
   inputting each of the speech features to the acoustic model;
   determining an intermediate speech feature extracted from each of the speech features based on the feature extraction layers;
   determining, based on the softmax function, a probability that the intermediate speech feature corresponds to each piece of syllable data in the acoustic model; and
   determining syllable data with a maximum probability as the syllable data.

3. The method according to claim 1, wherein determining the text data comprises:
  determining preset text data corresponding to the syllable data based on a fourth correspondence in the pronouncing dictionary, wherein the fourth correspondence is between the syllable data and the text data;
  determining a probability of each piece of preset text data based on the language model; and
  determining the preset text data with a maximum probability as the text data.

4. The method according to claim 1, further comprising:
  acquiring sample text corpuses, wherein the sample text corpuses include text corpuses of a first language and text corpuses of a second language;
  determining a plurality of sample words by segmenting sample text corpuses based on a preset algorithm of word segmentation;
  determining an occurrence probability that each sample word occurs in the sample text corpuses; and
  determining the language model by storing each sample word and the occurrence probability corresponding to each sample word into an initial language model.

5. The method according to claim 4, wherein determining the sample text corpuses comprises:
  acquiring first text corpuses of the first language, second text corpuses of the second language, and a correspondence between the first text corpuses and the second text corpuses;
  selecting at least one first text sub-corpus from each of the first text corpuses;
  determining a correspondence between the first text sub-corpus and the second text corpus;
  replacing each first text sub-corpus by a second text corpus based on the correspondence between the first text sub-corpuses and the second text corpuses to obtain mixed text corpuses; and
  determining the mixed text corpuses as the sample text corpuses.

6. The method according to claim 1, wherein the pronouncing dictionary comprises a pronouncing dictionary of a first language and a pronouncing dictionary of a second language.

7. An electronic device for speech recognition, comprising a processor and a memory, the memory storing at least one instruction, and the instruction being loaded and executed by the processor to perform:
  determining speech features of speech data by feature extraction on the speech data;
  determining syllable data corresponding to each of the speech features based on a plurality of feature extraction layers and a softmax function layer included in an acoustic model, wherein the acoustic model is configured to convert the speech feature into the syllable data;
  determining text data corresponding to the speech data based on a language model, a pronouncing dictionary and the syllable data, wherein the pronouncing dictionary is configured to convert the syllable data into the text data, and the language model is configured to evaluate the text data; and
  outputting the text data;
  wherein the instruction is loaded and executed by the processor to further perform:
  acquiring at least one piece of sample data, wherein each piece of sample data includes a sample speech feature and truth syllable data corresponding to the sample speech feature;
  determining the acoustic model by training an initial acoustic model based on predicted syllable data and the truth syllable data, wherein the predicted syllable data are obtained by inputting the sample speech feature into the initial acoustic model;
  wherein acquiring the sample data comprises:
  acquiring a first correspondence, a second correspondence and a third correspondence;
  wherein the first correspondence is between a first speech feature of a first language and first text data, the second correspondence is between a second speech feature of a second language and second text data, the third correspondence is between first text sub-data and the second text data, and the first text sub-data is a part of data in the first text data;
  determining second text data corresponding to each piece of first text sub-data based on the third correspondence, after selecting a plurality of pieces of first text sub-data randomly from the first text data;
  replacing each piece of first text sub-data by the second text data to obtain mixed text data;
  determining the mixed text data as the sample text data;
  replacing the first speech sub-feature corresponding to each piece of first text sub-data by the second speech feature corresponding to the second text data to obtain a mixed speech feature;
  determining the mixed speech feature as the sample speech feature;
  determining truth syllable data corresponding to each sample text data; and
  determining the sample data by combining the truth syllable data, and the sample speech feature.

8. The electronic device according to claim 7, wherein determining the syllable data comprises:
  inputting each of the speech features to the acoustic model;
  determining an intermediate speech feature extracted from each of the speech features based on the feature extraction layers;
  determining, based on the softmax function, a probability that the intermediate speech feature corresponds to each piece of syllable data in the acoustic model; and
  determining syllable data with a maximum probability as the syllable data.

9. The electronic device according to claim 7, wherein determining the text data comprises:
  determining preset text data corresponding to the syllable data based on a correspondence between the syllable data and the text data in the pronouncing dictionary;
  determining a probability of each piece of preset text data based on the language model; and
  determining the preset text data with a maximum probability as the text data.

10. The electronic device according to claim 7, further comprising:
  acquiring sample text corpuses, wherein the sample text corpuses include text corpuses of a first language and text corpuses of a second language;
  determining a plurality of sample words by segmenting sample text corpuses based on a preset algorithm of word segmentation;
  determining an occurrence probability that each the sample word occurs in the sample text corpuses; and
  determining the language model by storing each sample word and the occurrence probability corresponding to each sample word into an initial language model.

11. The electronic device according to claim 10, wherein determining the sample text corpuses comprises:
- acquiring first text corpuses of the first language, second text corpuses of the second language, and a correspondence between the first text corpuses and the second text corpuses;
- selecting at least one first text sub-corpus from each of the first text corpuses;
- determining a correspondence between the first text sub-corpus and the second text corpus;
- replacing each first text sub-corpus by a second text corpus based on the correspondence between the first text sub-corpuses and the second text corpuses to obtain mixed text corpuses; and
- determining the mixed text corpuses as the sample text corpuses.

12. The electronic device according to claim 7, wherein the pronouncing dictionary comprises a pronouncing dictionary of a first language and a pronouncing dictionary of a second language.

13. A non-transitory computer readable storage medium for speech recognition, wherein when an instruction in the storage medium is executed by a processor of an electronic device, the electronic device performs:
- determining speech features of speech data by feature extraction on the speech data;
- determining syllable data corresponding to each of the speech features based on a plurality of feature extraction layers and a softmax function layer included in an acoustic model, wherein the acoustic model is configured to convert the speech feature into the syllable data;
- determining text data corresponding to the speech data based on a language model, a pronouncing dictionary and the syllable data, wherein the pronouncing dictionary is configured to convert the syllable data into the text data, and the language model is configured to evaluate the text data; and
- outputting the text data;
- wherein when an instruction in the storage medium is executed by a processor of an electronic device, the electronic device further performs:
- acquiring at least one piece of sample data, wherein each piece of sample data includes a sample speech feature and truth syllable data corresponding to the sample speech feature;
- determining the acoustic model by training an initial acoustic model based on predicted syllable data and the truth syllable data, wherein the predicted syllable data are obtained by inputting the sample speech feature into the initial acoustic model;
- wherein acquiring the sample data comprises:
- acquiring a first correspondence, a second correspondence and a third correspondence; wherein the first correspondence is between a first speech feature of a first language and first text data, the second correspondence is between a second speech feature of a second language and second text data, the third correspondence is between first text sub-data and the second text data, and the first text sub-data is a part of data in the first text data;
- determining second text data corresponding to each piece of first text sub-data based on the third correspondence, after selecting a plurality of pieces of first text sub-data randomly from the first text data;
- replacing each piece of first text sub-data by the second text data to obtain mixed text data;
- determining the mixed text data as the sample text data;
- replacing the first speech sub-feature corresponding to each piece of first text sub-data by the second speech feature corresponding to the second text data to obtain a mixed speech feature;
- determining the mixed speech feature as the sample speech feature;
- determining truth syllable data corresponding to each sample text data; and
- determining the sample data by combining the truth syllable data, and the sample speech feature.

14. The computer readable storage medium according to claim 13, wherein determining the syllable data comprises:
- inputting each of the speech features to the acoustic model;
- determining an intermediate speech feature extracted from each of the speech features based on the feature extraction layers;
- determining, based on the softmax function, a probability that the intermediate speech feature corresponds to each piece of syllable data in the acoustic model; and
- determining syllable data with a maximum probability as the syllable data.

15. The computer readable storage medium according to claim 13, wherein determining the text data comprises:
- determining preset text data corresponding to the syllable data based on a correspondence between the syllable data and the text data in the pronouncing dictionary;
- determining a probability of each piece of preset text data based on the language model; and
- determining the preset text data with a maximum probability as the text data.

16. The computer readable storage medium according to claim 13, further comprising:
- acquiring sample text corpuses, wherein the sample text corpuses include text corpuses of a first language and text corpuses of a second language;
- determining a plurality of sample words by segmenting sample text corpuses based on a preset algorithm of word segmentation;
- determining an occurrence probability that each the sample word occurs in the sample text corpuses; and
- determining the language model by storing each sample word and the occurrence probability corresponding to each sample word into an initial language model.

17. The computer readable storage medium according to claim 16, wherein determining the sample text corpuses comprises:
- acquiring first text corpuses of the first language, second text corpuses of the second language, and a correspondence between the first text corpuses and the second text corpuses;
- selecting at least one first text sub-corpus from each of the first text corpuses;
- determining a correspondence between the first text sub-corpus and the second text corpus;
- replacing each first text sub-corpus by a second text corpus based on the correspondence between the first text sub-corpuses and the second text corpuses to obtain mixed text corpuses; and
- determining the mixed text corpuses as the sample text corpuses.

18. The computer readable storage medium according to claim 13, wherein the pronouncing dictionary comprises a pronouncing dictionary of a first language and a pronouncing dictionary of a second language.

* * * * *